United States Patent [19]

Gersho et al.

[11] 4,457,004
[45] Jun. 26, 1984

[54] MULTIDIMENSIONAL CHANNEL CODING

[75] Inventors: Allen Gersho, Goleta, Calif.; Victor B. Lawrence, Holmdel, N.J.

[73] Assignee: Bell Telephone Laboratories, Incorporated, Murray Hill, N.J.

[21] Appl. No.: 346,627

[22] Filed: Feb. 8, 1982

[51] Int. Cl.³ .................. H04L 25/04; H04L 25/20
[52] U.S. Cl. ............................ 375/67; 375/39; 375/42; 375/53; 332/17
[58] Field of Search ................... 375/38–40, 375/58, 60, 42, 53, 54, 17, 59, 67; 370/18, 19–23; 371/43–46; 455/63, 65; 340/347 DD; 332/17, 23 A

[56] References Cited

U.S. PATENT DOCUMENTS 4,084,137  4/1978  Welti ........................... 375/38

OTHER PUBLICATIONS

E. N. Gilbert, "A Comparison of Signalling Alphabets," Bell System Technical Journal, vol. 31, No. 3, May 1952, pp. 504–522.

Ian F. Blake, "The Leech Lattice as a Code for the Gaussian Channel," Information and Control 19, 1971, pp. 66–74.

George R. Welti and Jhong S. Lee, "Digital Transmission with Coherent Four Dimensional Modulation," IEEE Transactions on Information Theory, vol. IT-20, No. 4, July 1974, pp. 497–501.

G. R. Welti, "PCM/FDMA Satellite Telephone with 4-Dimensionally-Coded Quadrature Amplitude Modulation," Comsat Technical Review, vol. 6, No. 2, Fall 1976, pp. 323–338.

P. de Buda, "Encoding and Decoding Algorithms for an Optimal Lattice-Based Code," International Conference on Communications Conference Record, vol. 3, pp. 65.3.1–65.3.5.

Primary Examiner—Robert L. Griffin
Assistant Examiner—Albert W. Watkins
Attorney, Agent, or Firm—Ronald D. Slusky

[57] ABSTRACT

An n-dimensional channel code is used in a data transmission system. The alphabet of codewords (data symbols) comprises a subset of points of a selected coset of a selected lattice. The alphabet includes at least one point of the coset whose norm (signal energy) is greater than at least one other point of the coset which is excluded from the alphabet.

10 Claims, 4 Drawing Figures

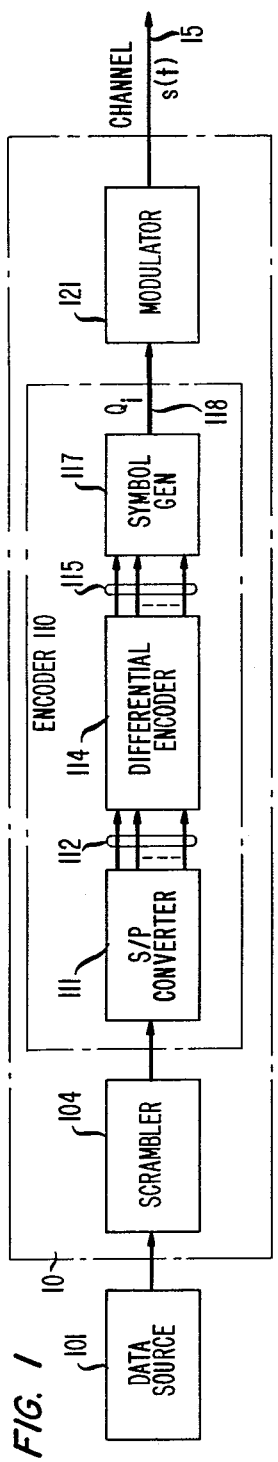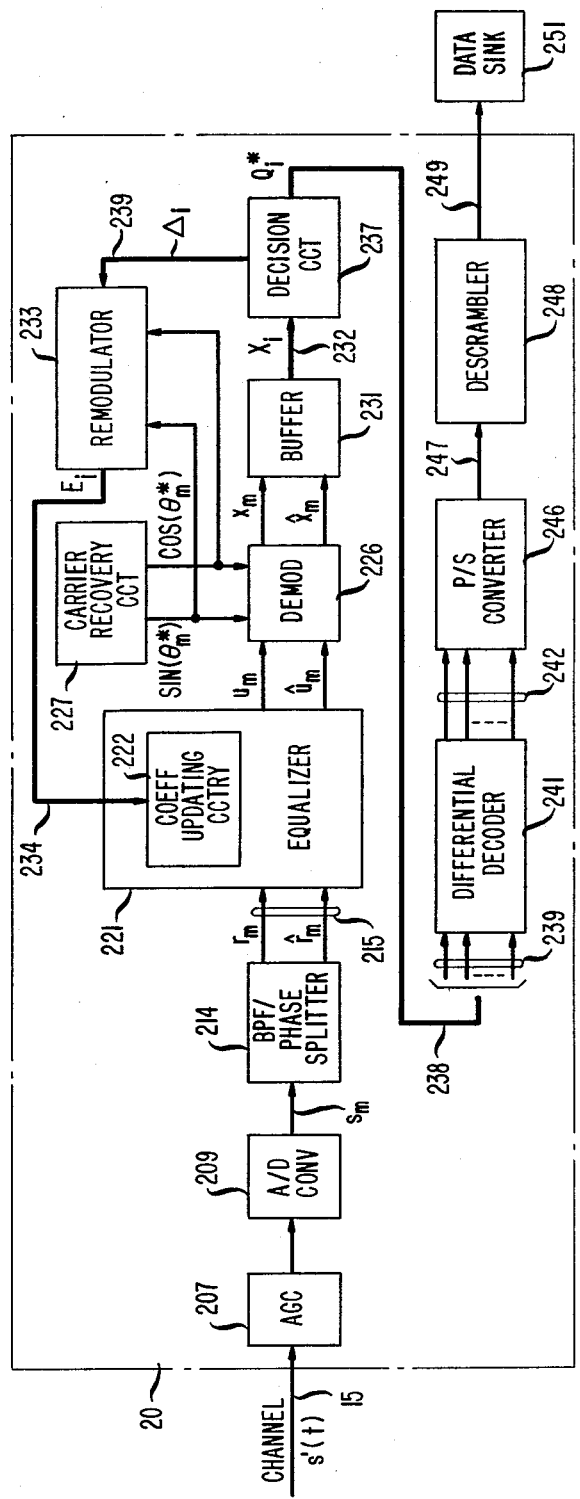

MULTIDIMENSIONAL CHANNEL CODING

BACKGROUND OF THE INVENTION

The present invention relates to data transmission systems which use multidimensional channel codes.

As used herein, the term "multidimensional code" refers to a code in which each codeword is comprised of n coordinates, or components, n>2. For example, each codeword of a four-dimensional code takes the form ($\alpha$ $\beta$ $\gamma$ $\delta$), where the components $\alpha$, $\beta$, $\gamma$ and $\delta$ take on predetermined combinations of values. One particularly advantageous application for multidimensional coding is in the transmission of data over a so-called Gaussian channel—a communications channel in which the transmitted signals are corrupted by Gaussian noise. In such a system, each possible value of an input signal indication, e.g., a binary word comprising a plurality of data bits to be transmitted, is assigned to a different member of a preestablished n-dimensional codeword "alphabet." (In these applications the codewords are also referred to as "data symbols.") As each input word is applied at the transmitting end of the system, the assigned member of the codeword alphabet is determined by table look-up or other means and a signal representing the codeword is applied to the channel. At the other end of the channel, the received, noise-corrupted codeword is decoded in a decoder, or decision-forming circuit. The function of the decoder is to form a (hopefully correct) decision as to what member of the codeword alphabet was actually transmitted by finding the codeword within the alphabet to which the received noise-corrupted codeword is closest in n-space. The principal advantage of using multidimensional codes in such applications is that, as taught by C. E. Shannon in his classic paper "Communication in the Presence of Noise," *Proc. IRE*, Vol. 37, January, 1949, pp. 10–21, the probability of a decoding error at the receiver decrease as the dimensionality of the codewords increases, given a particular channel and a fixed average power in the transmitted codewords.

SUMMARY OF THE INVENTION

A particularly advantageous class of n-dimensional codeword, or data symbol, alphabets for channel coding applications are alphabets whose members comprise a subset of points of a selected coset of a selected n-dimensional lattice. (An n-dimensional lattice is the set of all interger-valued linear combinations of a selected set of n linearly independent n-dimensional points. A coset of a lattice, or "lattice coset," is the set of all points arrived at by adding any selected n-dimensional vector to each point of the lattice. That vector may be the null vector, in which case the coset is the lattice itself.)

In the prior art, alphabets of the type just mentioned are constructed such that a point in the coset is included in the alphabet only if all points of lower norm are also included in the alphabet, the norm being the square root of the sum of the squares of the components of the point. This approach is followed because, for example, it achieves the optimum signal-to-noise ratio (SNR) for the coset in question. In accordance with the present invention, however, it has been recognized that it may be desirable to include in the alphabet at least one point of the selected lattice coset whose norm is greater than at least one other point of the coset which is excluded from the alphabet. This approach enables any one or more of a number of design objectives to be realized while, in general, incurring only a small SNR penalty.

For example, a particularly advantageous subclass of the above-mentioned class of alphabets is comprised of alphabets whose codewords comprise complete groups of points of the selected coset, each group comprising a respective basic lattice coset point, every distinct permutation of the components of the basic point, and every distinct point formed by changing the sign of any one or more of the components of the basic point and of each permutation. This sub-class is advantageous because, for example, it can be decoded via a relatively simple decoding technique disclosed, for example, by G. R. Welti et al in "Digital Transmission with Coherent Four-Dimensional Modulation," *IEEE Transactions on Information Theory*, Vol. IT-20, No. 4, July 1974, pp. 497–501. The availability of a simple decoding process is an important consideration in multidimensional coding applications; a very substantial amount of processing circuitry and/or time may be required if "brute-force" decoding techniques are used.

Disadvantageously, the requirement imposed by the above-mentioned decoding technique that the alphabet be comprised of complete groups of coset points, combined with the prior art's approach of including a point (or group) in the alphabet only if all points (or groups) of lower norm are also included in the alphabet, may make it impossible to arrive at an alphabet having a desired number of elements, e.g., a number which is an integer power of 2. However, by allowing the alphabet to include, in accordance with the invention, a coset point group whose norm is greater than another coset point group which is not included in the alphabet, it will often be possible to arrive at an alphabet which, in fact, has the desired number of elements.

Another objective in the design of data transmission systems is to preclude the transmission of numerous successive codeword elements of value zero; this can cause erroneous operation of the automatic gain control circuitry in the receiver. In accordance with the invention, if particular points of a coset used as the basis of a multidimensional channel code contain many successive zeroes, they can be omitted from the alphabet in favor of points which, although they have a higher norm, have fewer zeroes.

A further objective in the design of data transmission systems is to minimize the peak power of the transmitted signal in order to minimize the effects of nonlinear distortion in the transmission channel. In accordance with the invention, points of the selected coset which result in a relatively high peak transmitted signal power can be omitted from the alphabet in favor of points which, although they have a higher norm, result in a lower peak transmitted signal power.

The realization of yet other design objectives may be facilitated by constructing alphabets in accordance with the principles of the invention.

BRIEF DESCRIPTION OF THE DRAWING

FIG. 1 is a block diagram of a data signal transmitter which transmits multidimensional codes in accordance with the principles of the invention;

FIG. 2 is a block diagram of a data signal receiver which processes signals received from the transmitter of FIG. 1;

DETAILED DESCRIPTION

Figure 3:
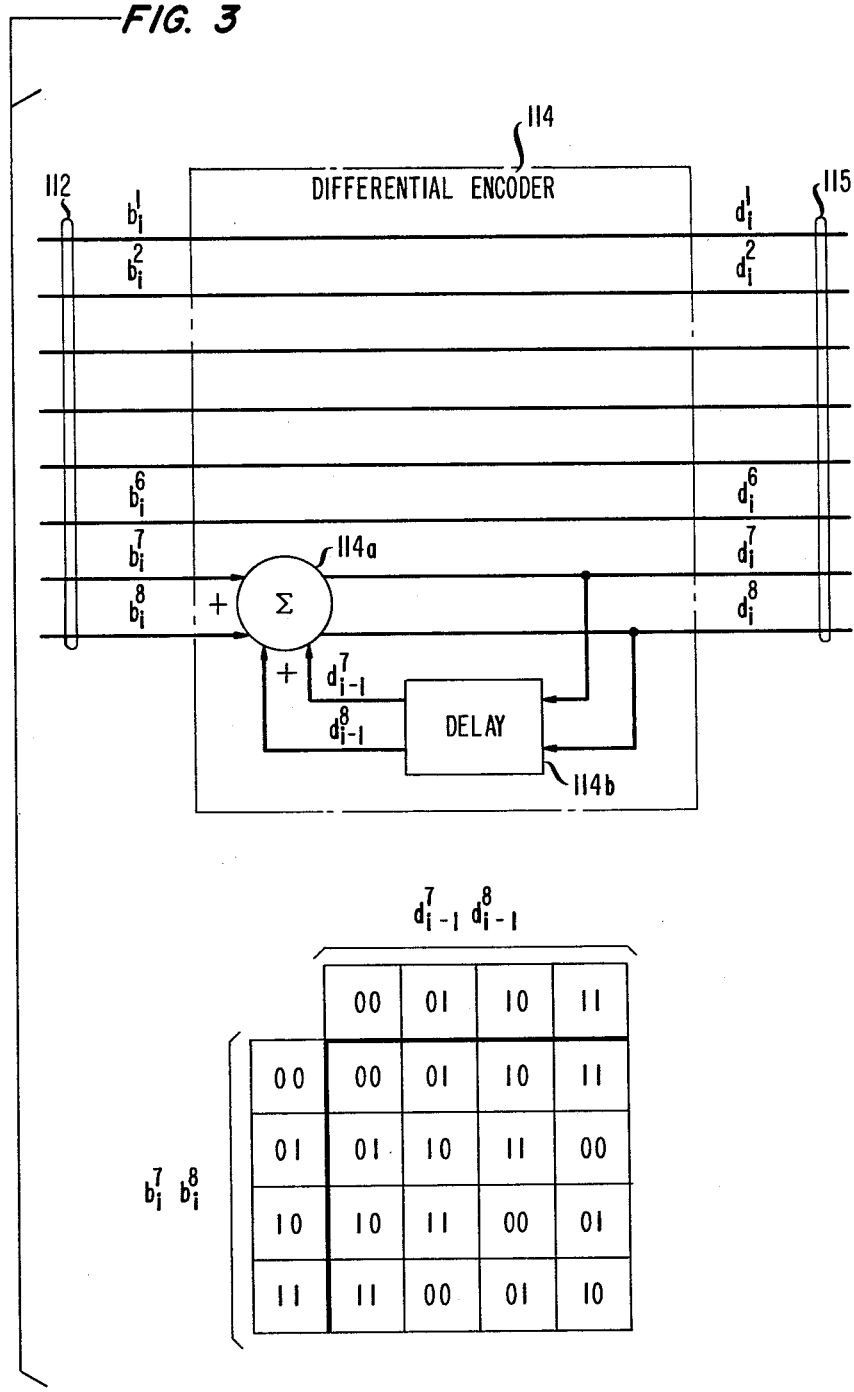
FIG. 3 is a block diagram of an illustrative differential encoder used in the transmitter of FIG. 1.

Transmitter 10 of FIG. 1 includes a scrambler 104, encoder 110 and modulator 121. Scrambler 104, in particular, receives a stream of binary data from a data source 101 which may be, for example, a digital computer. Scrambler 104 pseudo-randomizes the data to prevent concentrations of energy across the spectrum of the bandpass signal ultimately to be generated.

The output of scrambler 104 is a serial bit stream which is applied to encoder 110. The latter is comprised of a serial-to-parallel converter 111, differential encoder 114 and symbol generator 117. Serial-to-parallel converter 111 converts the bit stream received from scrambler 104 into a sequence of p-bit signal indications, or words, with the bits of each word being provided in parallel form on leads 112. The words on leads 112 are applied to differential encoder 114, the output of which is another sequence of p-bit signal indications, or words, (described more fully below), with the bits of each word being provided in parallel form on leads 115. The words on leads 115 are applied to symbol generator 117. The latter responds by extending to modulator 121 over cable 118 representations of n-dimensional data symbols to be transmitted over a communication channel 15. The values of the words on leads 115 are such that the values of successive words on leads 112 are represented by the vector difference between successive pairs of symbols on cable 118. (This approach enables the system to recover from so-called phase hits in the transmission channel.)

Modulator 121 responds to the data symbols provided from symbol generator 117 to generate a double sideband-quadrature carrier signal of the form $$s(t) = Re\left[\sum_m (a_m + jb_m)g(t - mT)e^{j\omega_c t}\right] \quad (1)$$

where T is the so-called baud interval, m is an index which advances at the baud rate 1/T, g(t) is a real function representing a so-called Nyquist pulse and $\omega_c$ is a selected radian carrier frequency. The portion of signal s(t) which extends over each baud interval is referred to herein as a double sideband-quadrature carrier pulse.

The so-called in-phase and quadrature-phase data symbol components $a_m$ and $b_m$ of Eq. (1) are provided by symbol generator 117 in the following manner: Symbol generator 117 responds to each different p-bit word on leads 115 by providing to the modulator a particular n-dimensional data symbol to which the value of that word is assigned. Since there are $M=2^p$ possible different words on leads 115, the symbol "alphabet" is comprised of M different symbols. The $i^{th}$ symbol provided to modulator 121 on cable 118 may be represented as the n-dimensional vector $$Q_i = [a_m, b_m, a_{m+1}, b_{m+1} \ldots a_{m+q-1}, b_{m+q-1}] \quad (2)$$

where $m=iq$ and $q=n/2$. Modulator 121 responds by transmitting symbol components $a_m$ and $b_m$ in accordance with the modulation format of (1) for the $m^{th}$ baud interval, $a_{m+1}$ and $b_{m+1}$ for the $(m+1)^{st}$ baud interval and so forth up through the last pair of components of $Q_i$—$a_{m+q-1}$ and $b_{m+q-1}$—transmitted in the $(m+q-1)^{st}$ baud interval. Each double sideband-quadrature carrier pulse thus represents a respective pair of components of the data symbol being transmitted. At this time, symbol $Q_{i+1}$ is available on cable 118 and the process continues. Since the signal representing each symbol is seen to extend over q baud intervals, the symbol rate is 1/qT n-dimensional symbols per second.

Signal s(t) is corrupted in channel 15 by such impairments as Gaussian noise, phase jitter, frequency offset and intersymbol interference. As shown in FIG. 2, the received corrupted signal s'(t) is applied to automatic gain control (AGC) circuit 207 within receiver 20 and thence to A/D converter 209. The latter illustratively operates at the baud rate 1/T. The resulting digital samples, $s_m$, are applied to bandpass filter/phase splitter 214. The latter provides two outputs on leads 215—a digital bandpass-filtered version of $s_m$, denoted $r_m$, and the Hilbert transform of $r_m$—denoted $\hat{r}_m$.

The Hilbert transform pair $r_m$, $\hat{r}_m$ is applied to equalizer 221 which generates a pair of passband outputs $u_m$ and $\hat{u}_m$ which are substantially free of intersymbol interference. More particularly, $u_m$ and $u_m$ are generated by equalizer 121 in accordance with the relations $$u_m = \sum_{i=0}^{L} [c_i(m)r_{m-i} - d_i(m)\hat{r}_{m-i}] \quad (3)$$

$$u_m = \sum_{i=0}^{L} [c_i(m)\hat{r}_{m-i} + d_i(m)r_{m-i}]$$

where L is a predetermined integer and the $c_i(m)$'s and $d_i(m)$'s are respective ensembles of so-called "tap" coefficients whose values are updated at the baud rate—and hence are a function of m—in a manner described below.

Passband equalizer outputs $u_m$ and $\hat{u}_m$ are demodulated by demodulator 226, yielding baseband signals $x_m$ and $\hat{x}_m$. In particular, $x_m$ and $\hat{x}_m$ are generated by demodulator 226 in accordance with the relations $$x_m = u_m\cos(\theta_m^*) + \hat{u}_m\sin(\theta_m^*) \quad (4)$$

$$\hat{x}_m = \hat{u}_m\cos(\theta_m^*) - u_m\sin(\theta_m^*)$$

where $\theta^*_m$ is an estimate of the current carrier phase (taking into account such impairments as phase jitter and frequency offset). For purposes of generating $x_m$ and $\hat{x}_m$ in accordance with the above relations, demodulator 226 receives digital representations of $\sin(\theta^*_m)$ and $\cos(\theta^*_m)$ from carrier recovery circuit 227.

The outputs of demodulator 226 in successive baud intervals are stored in buffer 231 for q baud intervals. Buffer 231 thereupon provides on cable 232 an n-dimensional received data point, the $i^{th}$ received data point being the n-dimensional vector $$X_i = [x_m, \hat{x}_m, x_{m+1}, \hat{x}_{m+1} \ldots x_{m+q-1}, \hat{x}_{m+q-1}]$$

for $m=iq$. The received data point on cable 232 is applied to a decision circuit (or decoder) 237. The function of the decision circuit is to form a (hopefully correct) decision $$Q^*_i = [a^*_m, b^*_m, a^*_{m+1}, b^*_{m+1} \ldots a^*_{m+q-1}, b^*_{m+q-1}]$$

as to what the transmitted data symbol was. Decision circuit 237 further includes a circuit which performs the inverse function of symbol generator 117. That is, for each decision $Q^*_i$ it determines the p-bit word assigned thereto and provides same to differential decoder 241 via cable 238.

If the received point was decoded correctly, the $i^{th}$ output word of differential decoder 241 is identical to the $i^{th}$ word applied to differential encoder 114 in the transmitter. (The differential encoder and differential decoder are both discussed further hereinbelow.) That output word is applied via leads 242 to parallel/serial converter 246. The serial output of converter 246 on lead 247 is descrambled in descrambler 248 and the descrambled bit stream is applied via lead 249 to data sink 251. The latter may be, for example, a digital computer or a computer terminal.

In addition to forming decision $Q^*_i$, decision circuit 237 forms an n-dimensional baseband error signal $\Delta_i$ given by $$\Delta_i = [\delta_m, \hat{\delta}_m, \delta_{m+1}, \hat{\delta}_{m+1} \cdots \delta_{m+q-1}, \hat{\delta}_{m+q-1}],$$

where $$\delta_m = x_m - a^*_m,$$

$$\hat{\delta}_m = \hat{x}_m - b^*_m, \text{ etc.}$$

Baseband error signal $\Delta_i$ is extended via cable 239 to remodulator 233 which forms an n-dimensional passband error signal $$E_i = [e_m, \hat{e}_m, e_{m+1}, \hat{e}_{m+1} \cdots e_{m+q-1}, \hat{e}_{m+q-1}]$$

where $$e_m = \delta_m \cos(\theta^*_m) - \hat{\delta}_m \sin(\theta^*_m),$$

$$\hat{e}_m = \delta_m \sin(\theta^*_m) + \hat{\delta}_m \cos(\theta^*_m) \quad (5)$$

etc.

To this end, remodulator 233, like demodulator 226, receives $\sin(\theta^*_m)$ and $\cos(\theta^*_m)$ from carrier recovery circuit 227.

The passband error signal $E_i$ is applied via cable 234 to coefficient updating circuitry 222 within equalizer 221. The updating circuitry periodically updates the values of the coefficients used in the equalizer in accordance with a predetermined set of updating equations. Any of various updating equations may be used. One possibility is $$c_i(m+1) = c_i(m) - \alpha[e_{m-1}r_{m-1-i} + \hat{e}_{m-1}\hat{r}_{m-1-i}]$$

$$d_i(m+1) = d_i(m) - \alpha[e_{m-1}\hat{r}_{m-1-i} - \hat{e}_{m-1}r_{m-1-i}] \quad (7)$$

Another possible approach, usable in systems in which $q=2$, is $$c_i(m+1) = c_i(m) - \alpha[e_{m-1}r_{m-1-i} + \hat{e}_{m-1}\hat{r}_{m-1-i}] \quad (8)$$

$$d_i(m+1) = d_i(m) - \alpha[e_{m-1}\hat{r}_{m-1-i} - \hat{e}_{m-1}r_{m-1-i}]$$

$$c_i(m+2) = c_i(m+1) - \alpha\gamma[e_{m+1}r_{m+1-i} + \hat{e}_{m+1}\hat{r}_{m+1-i}]$$

$$- \alpha\overline{\gamma}[e_m r_{m-i} + \hat{e}_m \hat{r}_{m-i}]$$

$$d_i(m+2) = d_i(m+1) - \alpha\gamma[e_{m+1}\hat{r}_{m+1-i} - \hat{e}_{m+1}r_{m+1-i}]$$

$$- \alpha\overline{\gamma}[e_m \hat{r}_{m-i} - \hat{e}_m r_{m-i}]$$

for m even. For each of these approaches, appropriate values for the parameters $\alpha, \gamma$ and $\overline{\gamma}$ can be determined experimentally under the constraints that $0 < \alpha < 1$, $0 < \gamma < \overline{\gamma}$ and $\gamma + \overline{\gamma} = 1$.

Carrier recovery circuit 227 determines $\theta^*_m$ in accordance with a predetermined updating equation. One possible such equation is $$\theta^*_{m+1} = \theta^*_m - \beta\left[\frac{r_m b^*_m + \hat{r}_m a^*_m}{(a^*_m)^2 + (b^*_m)^2}\right]$$

for all m. Another possible approach, usable in systems in which $q=2$, is $$\theta^*_{m+1} = \theta^*_m - \beta\left[\frac{r_m b^*_m + \hat{r}_m a^*_m}{(a^*_m)^2 + (b^*_m)^2}\right]$$

$$\theta^*_{m+2} = \theta^*_{m+1} - \frac{\beta\epsilon}{2}\left[\frac{r_{m+1} b^*_{m+1} + \hat{r}_{m+1} a^*_{m+1}}{(a^*_{m+1})^2 + (b^*_{m+1})^2}\right] -$$

$$\frac{\beta\overline{\epsilon}}{2}\left[\frac{r_m b^*_m + \hat{r}_m a^*_m}{(a^*_m)^2 + (b^*_m)^2}\right]$$

for m even. Again, appropriate values for the parameters $\beta, \epsilon$ and $\overline{\epsilon}$ for either of the above alternatives can be determined experimentally under the constraints that $0 < \beta < 1$, $0 < \overline{\epsilon} < \epsilon$ and $\overline{\epsilon} + \epsilon = 1$. (For drawing simplicity, connections to carrier recovery circuit 227 from leads 215 and cable 238 are not shown in FIG. 2, although they would be required in order to enable circuit 227 to determine $\theta^*_m$ in accordance with the above expressions.)

In the present illustrative embodiment, $p=8$ and $n=4$. That is, differential encoder 114 provides 8-bit words to symbol generator 117 and the latter responds by providing on cable 118 a presentation of a corresponding one of 256 (i.e., $2^8$) predetermined four-dimensional data symbols.

The alphabet of symbols generated by symbol generator 117 is comprised of groups of points of a selected coset of a selected four-dimensional lattice. The coset, in this particular case, is the lattice itself, and it illustratively comprises all four-dimensional points whose coordinates are either all even or all odd. Thus, for example, the coset includes the point (0 0 2 2), but not the point (0 0 1 1). More particularly, each of the coset groups comprising the alphabet includes a so-called basic point from the coset, every distinct permutation of the components of the basic point, and every distinct point formed by changing the sign of any one or more of the components of the basic point and of each permutation. There are, illustratively, seven basic points. Table I lists each basic point, its norm, which is equal to the square root of the sum of the squares of its components, and the total number of points in each group. (The square of the norm is proportional to the power of the transmitted signal within the symbol interval, i.e., of baud intervals, in which the point is transmitted. All points in a given group have the same norm.)

TABLE I

| Group | Basic Point | Norm | Points in Group |
|---|---|---|---|
| 1 | (1 1 1 1) | 2 | 16 |

TABLE I-continued

| Group | Basic Point | Norm | Points in Group |
|-------|-------------|------|-----------------|
| 2 | (2 0 0 0) | 2 | 8 |
| 3 | (2 2 0 0) | $2\sqrt{2}$ | 24 |
| 4 | (2 2 2 0) | $2\sqrt{3}$ | 32 |
| 5 | (3 1 1 1) | $2\sqrt{3}$ | 64 |
| 6 | (2 2 2 2) | 4 | 16 |
| 7 | (3 3 1 1) | $2\sqrt{5}$ | 96 |
|   |           |      | 256 |

Group 1, for example, includes the points (1 1 1 1), (1 −1 1 1), (−1 −1 −1 −1), etc; Group 5, for example, includes the points (3 1 1 1), (1 1 3 1), (3 −1 1 1), (1 −3 −1 −1), (1 1 −3 1), etc; and so forth.

The group of the coset whose basic point is (4 0 0 0) is excluded from the alphabet, in accordance with the invention, even though its norm, 4, is lower than the norm, $2\sqrt{5}$, of the points in Group 7. Stated another way, there are points in the alphabet, i.e., the Group 7 points, whose norm is greater than the norm of other points in the coset which are excluded from the alphabet. This results in a somewhat worse signal-to-noise ratio for this alphabet than if the excluded points were included in the alphabet. Advantageously, however, the exclusion of those points provides an alphabet (a) comprised only of complete groups of coset points, allowing for simple decoding of the received signal points, and (b) the number of whose members is an integer power of two, i.e., $2^8 = 256$.

Of course, an alphabet having 256 points could be constructed by including the eight points comprising the (4 0 0 0) group in the alphabet and either (a) excluding eight selected points from Group 7 or (b) substituting for the (3 3 1 1) group a different group whose norm is also $2\sqrt{5}$ but which has eight fewer points than the (3 3 1 1) group. The problem with the first alternative is that, with an incomplete group of coset points in the alphabet, the above-described simple decoding process could not be used without modifications that would make decoding more complex. The problem with the second alternative is that no such different group, in fact, exists. One could, of course, try to find another lattice coset from which an alphabet having the desired number of points, in complete groups, could be constructed without excluding points in accordance with the invention. Such an alphabet, however, might not have as good a signal-to-noise ratio as, for example, that presented in Table I, because the points of the coset might not be as tightly packed.

There is at least one further advantage to excluding the (4 0 0 0) group from the alphabet. If it were included, the transmission of one of the symbols (2 0 0 0) or (4 0 0 0) followed by the symbol (0 0 0 4), which would occur on a random basis, might cause automatic gain control problems in that the reception of many consecutive zeroes tends to cause the gain of AGC circuit 207 to increase to a point where the data signal may be momentarily clipped in the A/D converter. This, in turn, could result in decoding errors. Eliminating the (4 0 0 0) group from the alphabet tends to avoid this problem. (The gain of AGC circuit 207 will, of course, also tend to increase substantially in response to reception of (2 0 0 0) followed by (0 0 0 2). However, the clipping, if any, would not be as severe because the amplitude of the data signal, when representing a "2" is not as great as when it is representing a "4". Moreover, elimination of the (2 0 0 0) group, i.e., Group 2, would cause an unacceptably severe reduction in signal-to-noise ratio for the alphabet as a whole since that group has a very low norm.

Illustrative realizations of differential encoder 114, symbol generator 117, decision circuit 237 and differential decoder 241 will now be described.

FIG. 3 depicts an illustrative realization of differential encoder 114. As seen in that FIG., the first six bits $b^1_i$, $b^2_i$ ... $b^6_i$ of the $i^{th}$ word applied to the differential encoder on leads 112 simply pass through to become the first six bits $d^1_i$, $d^2_i$ ... $d^6_i$ of the differential encoder output word on leads 115. The last two bits $d^7_i$ and $d^8_i$ of the differential encoder output word are formed by two-bit adder circuit 114a, which responds to bits $b^7_i$, $b^8_i$, $d^7_{i-1}$ and $d^8_{i-1}$ (the latter two bits being provided by delay unit 114b) to generate bits $d^7_i$ and $d^8_i$ in accordance with the table also shown in FIG. 3.

As previously noted, symbol generator 117, which is illustratively a read-only memory, generates a different one of the $M = 256$ data symbols of the alphabet for each of the 256 different possible values of the differential encoder output word. Illustratively, a scheme for assigning each input word value to a respective data symbol is as follows:

Assign the word (a b c d e f 0 0) to the symbol ($\alpha$ $\beta$ $\gamma$ $\delta$), where a, b, c, d, e and f are any selected six bits and $\alpha$, $\beta$, $\gamma$ and $\delta$ are the four coordinates of any selected one of the symbols of the alphabet. Then assign the words (a b c d e f 0 1), (a b c d e f 1 0) and (a b c d e f 1 1) to the symbols ($\beta$ $-\alpha$ $\delta$ $-\gamma$), ($-\alpha$ $-\beta$ $-\gamma$ $-\delta$) and ($-\beta$ $\alpha$ $-\delta$ $\gamma$), respectively. Then select another six bits g h i j k and l and another symbol ($\gamma$ $\zeta$ $\eta$ $\theta$) and follow the same pattern, i.e., assign the words (g h i j k l 0 0), (g h i j k l 0 1), (g h i j k l 1 0) and (g h i j k l 1 1) to the symbols ($\epsilon$ $\zeta$ $\eta$ $\theta$), ($\zeta$ $-\epsilon$ $\theta$ $-\eta$), ($-\epsilon$ $-\zeta$ $-\eta$ $-\theta$) and ($-\zeta$ $\epsilon$ $-\theta$ $\eta$), respectively. This process is repeated until all the assignments have been made.

The combination of the above-described differential encoding and symbol assignment schemes results in a transmission system in which the value of each 8-bit word on leads 112 is represented by the vector difference between a pair of successively transmitted four-dimensional data symbols. As in differential encoding schemes for two-dimensional codes, this approach avoids the possibility that a phase "hit" in the transmission channel will cause a "rotation" in the decoder, and thus incorrect decoding of all signal points received after the phase hit.

Decision circuit 237 illustratively follows the above-mentioned decoding scheme described by Welti et al. First, in particular, the minus signs are removed from the coordinates of $X_i$ and are stored. Then, the coordinates of the resulting point are permuted so that they are in descending magnitude order, resulting in a point $X'_i$. The permutation, i.e., the way in which the coordinates were permuted so as to put them in descending order, is also stored. Next, it is determined which of the seven basic points of the alphabet is closest in Euclidian distance to $X'_i$. This can be done, for example, by computing $$W_k = (Y_k X_i) - \epsilon_k/2$$

for $k=1,2,\ldots 7$, where $Y_k$ is the $k^{th}$ basic point and $\epsilon_k$ is the energy of $Y_k$. The index k for which $W_k$ is largest determines the basic point type $Y_K$. Taking that basic point, permuting it using the inverse of the stored permutation and reinserting the stored minus signs gives the decision $Q^*_i$. This decoding scheme is readily implemented using, for example, a microprocessor or circuitry operating under the control of micro-code.

Figure 4:
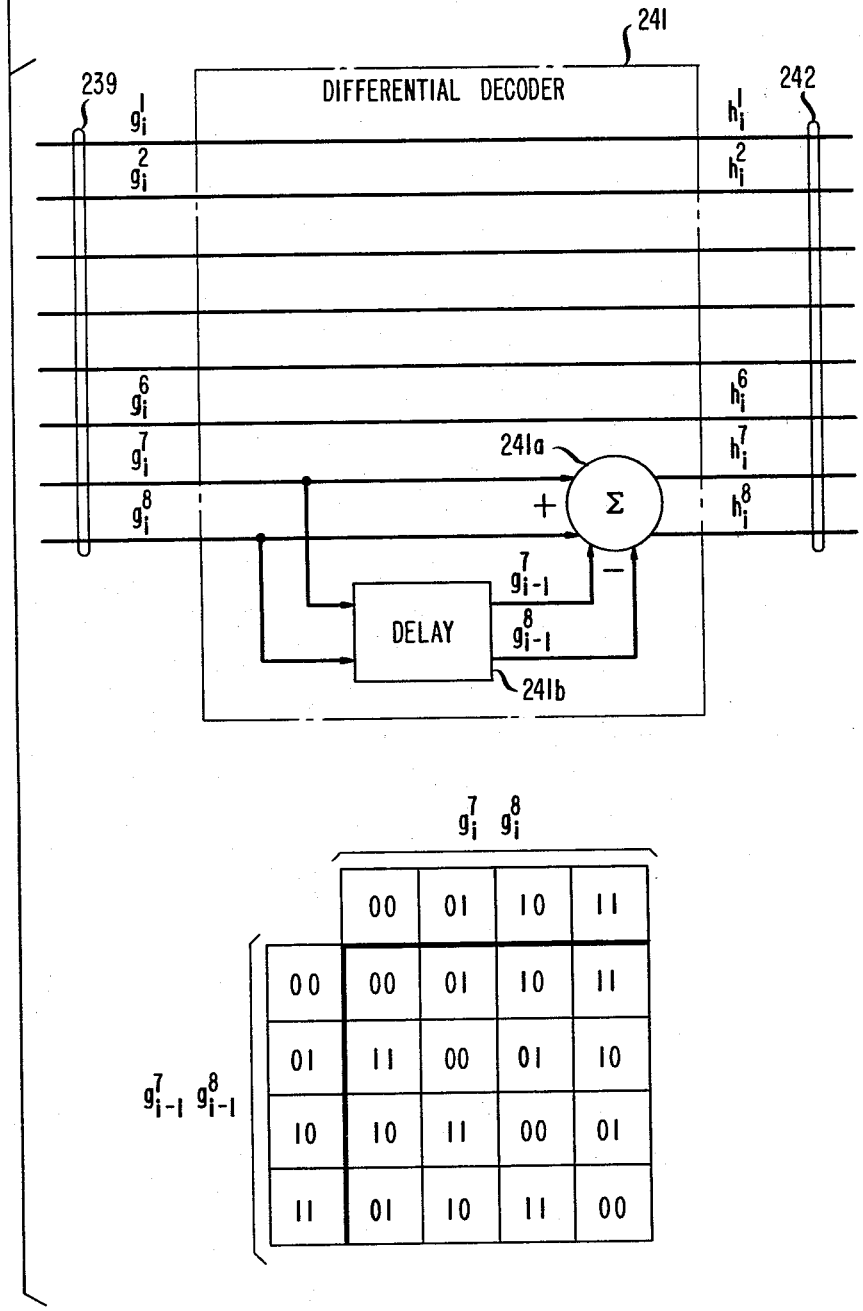
FIG. 4 is a block diagram of an illustrative differential decoder used in the receiver of FIG. 2.

An illustrative realization of differential decoder 241 is shown in FIG. 4. The first six bits $g^1_i, g^2_i, \ldots g^6_i$ of the $i^{th}$ word applied to the differential decoder on leads 239 of cable 238 simply pass through to become the first six bits $h^1_i, h^2_i \ldots h^6_i$ of the differential decoder output word on leads 242. The last two bits $h^7_i$ and $h^8_i$ of the differential decoder output word are formed by two-bit subtractor circuit 241a which responds to bits $g^7_i$, $g^8_i$, $g^7_{i-1}$ and $g^8_{i-1}$ (the latter two bits being provided by delay unit 241b) to generate bits $h^7_i$ and $h^8_i$ in accordance with the table also shown in FIG. 4.

The foregoing merely illustrates the principles of the invention. Those skilled in the art will be able to devise numerous arrangements and methods which, although not explicitly shown or described herein, embody these principles and, thus, do not depart from their spirit and scope. Thus, for example, it will be appreciated that the invention can be used with cosets of any dimensionality, even though a four-dimensional coset was discussed herein by way of example. Moreover, the invention can be used in virtually any multidimensional data transmission system. For example, it is not limited to systems which transmit two coordinates per baud, as is the case in the present illustrative embodiment.

What is claimed is:

1. Signal processing apparatus comprised of
means for receiving a sequence of signal indications each having one of M predetermined values,
means for generating for each of said signal indications, as a function of its value, a signal representing a particular member of a predetermined n-dimensional alphabet, said alphabet being comprised of M points of a selected coset of a selected n-dimensional lattice, $n>2$, at least one of said M points having a norm which is greater than the norm of at least one other point of said coset which is not included in said alphabet, and at least one of said M points having a norm which is different from the norm of at least one other of said M points, and
means for applying each signal thus generated to a communication channel.

2. The invention of claim 1 wherein said coset is comprised of all points in n-space whose coordinates are either all even or all odd.

3. The invention of claim 1 wherein $M=256$ and $n=4$ and said alphabet comprises the basic points (1 1 1 1), (2 0 0 0), (2 2 0 0), (2 2 2 0), (3 1 1 1), (2 2 2 2) and (3 3 1 1), every distinct permutation of the coordinates of each of said basic points and every distinct point formed by changing the sign of any one or more of the coordinates of said basic points and each of said permutations.

4. The invention of claim 1 wherein said coset comprises a plurality of groups of coset points, each of said groups comprising a respective basic point, every distinct permutation of the components of said basic point, and every distinct point formed by changing the sign of any one or more of the components of said basic point and of each said permutation, wherein said alphabet includes predetermined ones of said groups and wherein the norm of at least one of the groups included in said alphabet is greater than the norm of at least one of the groups of said coset which is not included in said alphabet.

5. The invention of claims 1, 2, 3 or 4 wherein said signal comprises a succession of double sideband-quadrature carrier pulses, each of said pulses representing a respective pair of components of said particular member of the alphabet.

6. A method for processing a received sequence of signal indications each having one of M predetermined values, said method comprising the steps of
generating for each of said signal indications, as a function of its value, a signal representing a particular member of a predetermined n-dimensional alphabet, said alphabet being comprised of M points of a selected coset of a selected n-dimensional lattice, $n>2$, at least one of said M points having a norm which is greater than the norm of at least one other point of said coset which is not included in said alphabet, and at least one of said M points having a norm which is different from the norm of at least one other of said M points, and
applying each signal thus generated to a communication channel.

7. The invention of claim 6 wherein said coset is comprised of all points in n-space whose coordinates are either all even or all odd.

8. The invention of claim 6 wherein $M=256$ and $n=4$ and said alphabet comprises the basic points (1 1 1 1), (2 0 0 0), (2 2 0 0), (2 2 2 0), (3 1 1 1), (2 2 2 2) and (3 3 1 1), every distinct permutation of the coordinates of said basic points and every distinct point formed by changing the sign of any one or more of the coordinates of each of said basic points and each of said permutations.

9. The invention of claim 6 wherein said coset comprises a plurality of groups of coset points, each of said groups comprising a respective basic point, every distinct permutation of the components of said basic point, and every distinct point formed by changing the sign of any one or more of the components of said basic point and of each said permutation, wherein said alphabet includes predetermined ones of said groups and wherein the norm of at least one of the groups included in said alphabet is greater than the norm of at least one of the groups of said coset which is not included in said alphabet.

10. The invention of claims 6, 7, 8 or 9 wherein said signal comprises a succession of double sideband-quadrature carrier pulses, each of said pulses representing a respective pair of components of said particular member of the alphabet.

* * * * *